United States Patent
Ngai

(10) Patent No.: US 7,464,174 B1
(45) Date of Patent: Dec. 9, 2008

(54) SHARED NETWORK-INTERFACE CONTROLLER (NIC) USING ADVANCED SWITCHING (AS) TURN-POOL ROUTING FIELD TO SELECT FROM AMONG MULTIPLE CONTEXTS FOR MULTIPLE PROCESSORS

(75) Inventor: Henry P. Ngai, Coto De Caza, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 827 days.

(21) Appl. No.: 10/906,783

(22) Filed: Mar. 7, 2005

(51) Int. Cl.
*G06F 15/16* (2006.01)
*G06F 15/173* (2006.01)

(52) U.S. Cl. ............... 709/234; 709/232; 709/238; 709/250

(58) Field of Classification Search ......... 709/232–234, 709/238–242, 250; 719/311, 328; 370/351–356, 370/466–469
See application file for complete search history.

(56) References Cited

U.S. PATENT DOCUMENTS

| | | | |
|---|---|---|---|
| 5,535,338 A | 7/1996 | Krause et al. ............... 709/222 |
| 5,710,908 A | 1/1998 | Man ............................ 709/230 |
| 5,748,911 A | 5/1998 | Maguire et al. ............. 710/303 |
| 6,041,063 A | 3/2000 | Povlsen et al. ......... 370/395.53 |
| 6,094,700 A | 7/2000 | Deschepper et al. ........ 710/313 |
| 6,101,188 A | 8/2000 | Sekine et al. ............... 370/401 |
| 6,151,651 A | 11/2000 | Hewitt et al. ............... 710/315 |
| 6,256,700 B1 | 7/2001 | Sauber ....................... 710/316 |
| 6,289,388 B1 | 9/2001 | Disney et al. ............... 709/238 |
| 6,314,525 B1 | 11/2001 | Mahalingham et al. ........ 714/4 |
| 6,385,197 B1 | 5/2002 | Sugihara .................... 370/380 |
| 6,456,590 B1 | 9/2002 | Ren et al. ................... 370/229 |
| 6,473,803 B1 | 10/2002 | Stern et al. ................. 709/238 |
| 6,614,800 B1 | 9/2003 | Genty et al. ................ 370/464 |
| 6,658,480 B2 * | 12/2003 | Boucher et al. ............. 709/239 |
| 6,687,758 B2 | 2/2004 | Craft et al. ................. 709/250 |
| 6,738,821 B1 | 5/2004 | Wilson et al. .............. 709/230 |
| 6,757,725 B1 | 6/2004 | Frantz et al. ............... 709/223 |

(Continued)

OTHER PUBLICATIONS

ASI-SIG, "Protocol Interface #8 (PI-8) PCI-Express to Advanced Switching Bridge Architecture Specification" R1.0, Feb. 2004, pp. 1-4, 8-11.

(Continued)

*Primary Examiner*—Bharat N Barot
(74) *Attorney, Agent, or Firm*—Stuart T. Auvinen; gPatent LLC

(57) ABSTRACT

A network connection is transparently shared among two or more processors. A shared network interface controller (NIC) has two or more sets of context registers that may include Ethernet command and pointer registers. Each set of context registers is accessed by a different processor. The processors are separated from the shared NIC by an Advanced Switching (AS) network. AS packets to write the context registers are embedded in AS packets that contain turnpool information that specifies a route through the AS network. Turnpools for AS packets from the different processors are unique and used to indicate which set of context registers to access. Each turnpool-identified context is assigned a different external network (Ethernet) address. External packets received by the shared NIC from the external network are sent inside AS packets over the AS network to the correct processor by associating the packet's external network address with a turnpool-context.

20 Claims, 9 Drawing Sheets

U.S. PATENT DOCUMENTS

| | | |
|---|---|---|
| 6,769,009 B1 | 7/2004 | Reisman .................... 709/201 |
| 6,771,612 B1 | 8/2004 | Park .......................... 370/276 |
| 6,775,283 B1 | 8/2004 | Williams .................... 370/392 |
| 6,816,929 B2 | 11/2004 | Ueda ............................ 710/56 |
| 6,839,777 B1 | 1/2005 | Vrancic et al. ................ 710/52 |
| 6,874,042 B2 | 3/2005 | Sauber ......................... 710/38 |
| 7,177,941 B2 * | 2/2007 | Biran et al. ................. 709/232 |
| 7,269,666 B1 * | 9/2007 | Leitner et al. ............... 709/250 |
| 7,325,167 B2 * | 1/2008 | David et al. .................... 714/44 |
| 2004/0109473 A1 | 6/2004 | Lebizay et al. ............. 370/466 |
| 2004/0128410 A1 | 7/2004 | Mayhew et al. ............... 710/30 |
| 2004/0172485 A1 * | 9/2004 | Naghshineh et al. ........ 709/250 |
| 2004/0179534 A1 | 9/2004 | Pettey ...................... 370/395.5 |
| 2004/0252722 A1 | 12/2004 | Wybenga et al. ............. 370/474 |
| 2004/0268015 A1 | 12/2004 | Pettey et al. ................. 710/313 |
| 2005/0010709 A1 | 1/2005 | Davies et al. ................ 710/305 |
| 2005/0068964 A1 | 3/2005 | Wright et al. .......... 370/395.21 |

OTHER PUBLICATIONS

ASI-SIG, "Advanced Switching Core Architecture Specification" Revision 1.0, Dec. 2003, pp. 1-10, 32-36, 43-46.

PCI-SIG, "PCI-Express Base Specification" Revision 1.0a, Apr. 15, 2003, pp. 1-8, 41-44, 46, 50.

* cited by examiner

_US 7,464,174 B1_

SHARED NETWORK-INTERFACE CONTROLLER (NIC) USING ADVANCED SWITCHING (AS) TURN-POOL ROUTING FIELD TO SELECT FROM AMONG MULTIPLE CONTEXTS FOR MULTIPLE PROCESSORS

FIELD OF THE INVENTION

This invention relates to network interface controllers (NIC's), and more particularly for sharing a NIC on an Advanced Switching (AS) local network.

BACKGROUND OF THE INVENTION

Networks have substantially increased the usefulness of computers such as personal computers (PC's). A local-area network (LAN) such as an Ethernet can connect several PC's together, and an Internet router or gateway on the Ethernet can allow all PC's to reach the larger Internet.

Peripherals and other devices such as keyboards and mice may be connected to an individual PC using smaller, less complex networks such as Peripheral Component Interconnect Express (PCIE) or Universal-Serial-Bus (USB). Such peripheral devices were traditionally daisy-chained together, but more recently USB hubs or PCIE switches are being used.

FIG. 1 shows a PC connecting to peripherals using a PCIE switch. PCIE switch 20 has several ports that connect to PCIE links 22. Processor host 10, such as a processor on a PC, acts as the host or root controller for all PCIE transactions. PCIE media-access controller (MAC) 12 converts commands and data from host 10 to PCIE packets that are transmitted serially over PCIE link 22 to PCIE switch 20.

Similarly, each peripheral such as video 18, disk 14, and Ethernet NIC 16 has its own PCIE MAC 12 for communicating over a PCIE link 22 to PCIE switch 20. Video 18, disk 14, and Ethernet NIC 16 act as PCIE slave devices while host 10 acts as the master. Each PCIE link 22 has two pairs of signal wires that carry full-duplex differential data in both directions. Power and ground may also be present in cables for PCIE links 22.

PCIE switch 20 switches data among ports for PCIE links 22 as required.

While PCIE is useful, the PCIE standard allows for only one host with a single address space. Connecting two or more hosts together is problematic and may required specialized software. Communication buffers such as I/O ports may be used. To connect two or more hosts together, and extension of PCIE known as Advanced Switching (AS) was developed.

FIG. 2 shows 2 hosts sharing some peripherals over a common AS switching network. Processor A in host 10 and processor B in host 40 could be separate PC's, or could be two processors in a single PC, or separate blade servers sharing a chassis. Rather than use PCIE switches, a different higher-level protocol built using the physical layer of PCIE is used, Advanced Switching (AS). AS switches 32, 34, 36 can have more than one host. AS packets include routing information to instruct each of AS switches 32, 34, 36 how to route packets among the switch's ports.

Each of host 10, 40 has a PCIE/AS bridge 30, allowing commands and data from each host to be converted to AS packets and transmitted over AS links to AS switches 32, 34, 36. AS links 220-229 can physically be PCIE cables using two differential pairs for serial-data transmission and reception. However, rather than transmit PCIE packets, higher-level AS packets may encapsulate PCIE packets for transmission over AS links 220-229 and through AS switches 32, 34, 36.

Each host can have a set of peripherals that it frequently communicates with. For example, host 40 can use video 19, disk 44, and Ethernet NIC 46, which each have a PCIE/AS bridge 30 to connect to AS switch 34 over links 229, 227, and 228, respectively. Host 10 can primarily use video 18, disk 14, and Ethernet NIC 16 through AS switches 32, 36 and AS links 222-226.

Some sharing of peripherals is possible. For example, host 40 may access data on disk 14 that is normally used by host 10. Host 40 sends an AS packet over links 220, 221, 222, 223 and through AS switches 34, 32, 36 to reach disk 14. One host could write graphics data to the other host's video in a similar way, although potential contention could occur.

However, sharing of Ethernet NIC 16 or Ethernet NIC 46 is more difficult, since each NIC typically has only one set of command and data registers. Since a large number of registers are written over a period of time to transmit an Ethernet packet, one host could over-write part of the data or commands in these registers, ruining the packet transmission for the other host. So generally Ethernet NIC's are not shared.

FIG. 3 highlights turnpool routing through AS switches. In contrast to Internet routers, AS switches 32, 34, 36 are much simpler. Rather than have routing tables that look up packet destination addresses, AS switches 32, 34, 36 read low-level routing information from AS packets. This routing information tells each of AS switches 32, 34, 36 how to route AS packets through that switch. This routing information is known as turnpool information, since the routing information tells each AS switch how many ports to rotate through to find the exit port.

For example, for AS switch 34, an AS packet is received over link 220 from host 40. Turnpool information contained in the header of this AS packet includes turnpool 38, a direction bit, and a turnpool pointer. Turnpool 38 is a field that has a turn number for each switch the packet should pass through to reach its destination (disk 14 in this example). Turnpool 38 is (5, 1, 3) in this example. Since the direction bit is 0, the direction is forward, and turnpool 38 is read forwards, starting with 5, then 1, then 3, for AS switches 34, 32, 36, respectively. The turnpool pointer is incremented after each AS switch to point to the next turn number in turnpool 38. Initially the turn pointer points to the first turn number, 5.

Each turn number in turnpool 38 indicates how may ports to skip over between the ingress port and the egress port of that AS switch. For example, the AS packet first reaches AS switch 34 over link 220 on port P0. The turn number 5 indicates that 5 ports are skipped over to find the egress port. Thus ports P1, P2, P3, P4, and P5 are skipped over, and port P6 is the egress port. The AS packet is then sent out port P6, over link 221 to AS switch 32. The turnpool pointer is decremented to point to the next turn number in turnpool 38, the second number 1.

The AS packet from link 221 is received on port P3 of AS switch 32. The middle turnpool value is 1, so one port (P4) is skipped. The egress port is P5. The turnpool pointer is decremented to point to the next turn number in turnpool 38, the first number 3. The AS packet is sent out port P5 of AS switch 32, over link 222 to switch 36.

Switch 36 receives the AS packet from link 222 on port P3. The first turn number is 3, so 3 ports (P4, P5, P6) are skipped over to find the egress port (P7). The AS packet is sent out port P7 over link 223 to disk 14.

A reply packet can easily be sent back from disk 14 to host 40 using the same turnpool. Turnpool 38 is coped into the AS header of the reply packet, and the turnpool pointer is reset and the direction bit is inverted. The direction bit of 1 indicates that turnpool 38 is read in backward order, and that ports are skipped over in counter-clockwise rather than clockwise order. Thus the reply packet can be routed back over the same route using the same turnpool 38 by inverting the direction bit.

During initialization, AS packets can be broadcast from one host or initialization device to all possible ports on all switches. Packets that reach destinations are replied to and sent back to the initialization device, which can build a table of network connections and turnpool values to reach those destinations.

FIG. 4 highlights PCIE tunneling through an AS fabric. Protocol-interface 8 (P18) is a special encoding used with AS packets when the AS packet encapsulates a PCIE packet. Data to be transmitted over the Internet or an Ethernet, such as a packet fragment, may be placed in the data payload of a PCIE packet. The PCIE packet is encapsulated by an AS header and P18 encoding is applied. The turnpool information needed to route the AS packet to the Ethernet NIC is added to the AS header, allowing the packet to pass through the AS switches in the AS fabric. This path through the AS fabric is a PI8-encoded tunnel.

The peripheral receives the AS packet, removes the P18 encoding and extracts the PCIE packet. The data payload of the AS packet contains the Ethernet packet fragment which can be combined with other fragments and sent over the Ethernet as an Ethernet packet.

FIG. 5 shows encapsulation of a PCIE packet by AS. PCIE packet 60 can carry a variety of data in data payload 62. Ethernet data such as Ethernet packet fragment 64 can be carried in PCIE data payload 62. PCIE header 58 is attached to payload 62 to form PCIE packet 60.

PCIE packet 60 is encapsulated by AS packet 50. Turnpool information including turn numbers, a direction bit, and a turnpool pointer is added as turnpool field 54. AS header 52 contains additional AS header information. A checksum or AS CRC 56 may be added for error detection. AS packet 50 is sent over the AS fabric from the host to a peripheral.

While AS switching is useful, it is desirable to share peripherals among two or more hosts on the AS fabric. A shared Ethernet NIC for use with AS networks is desirable. A shared Ethernet NIC that uses features of AS switching to more effectively and transparently share a network gateway is desirable.

BRIEF DESCRIPTION OF THE DRAWINGS

FIG. 5 shows encapsulation of a PCIE packet by AS.

DETAILED DESCRIPTION

The present invention relates to an improvement in shared network interface controllers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
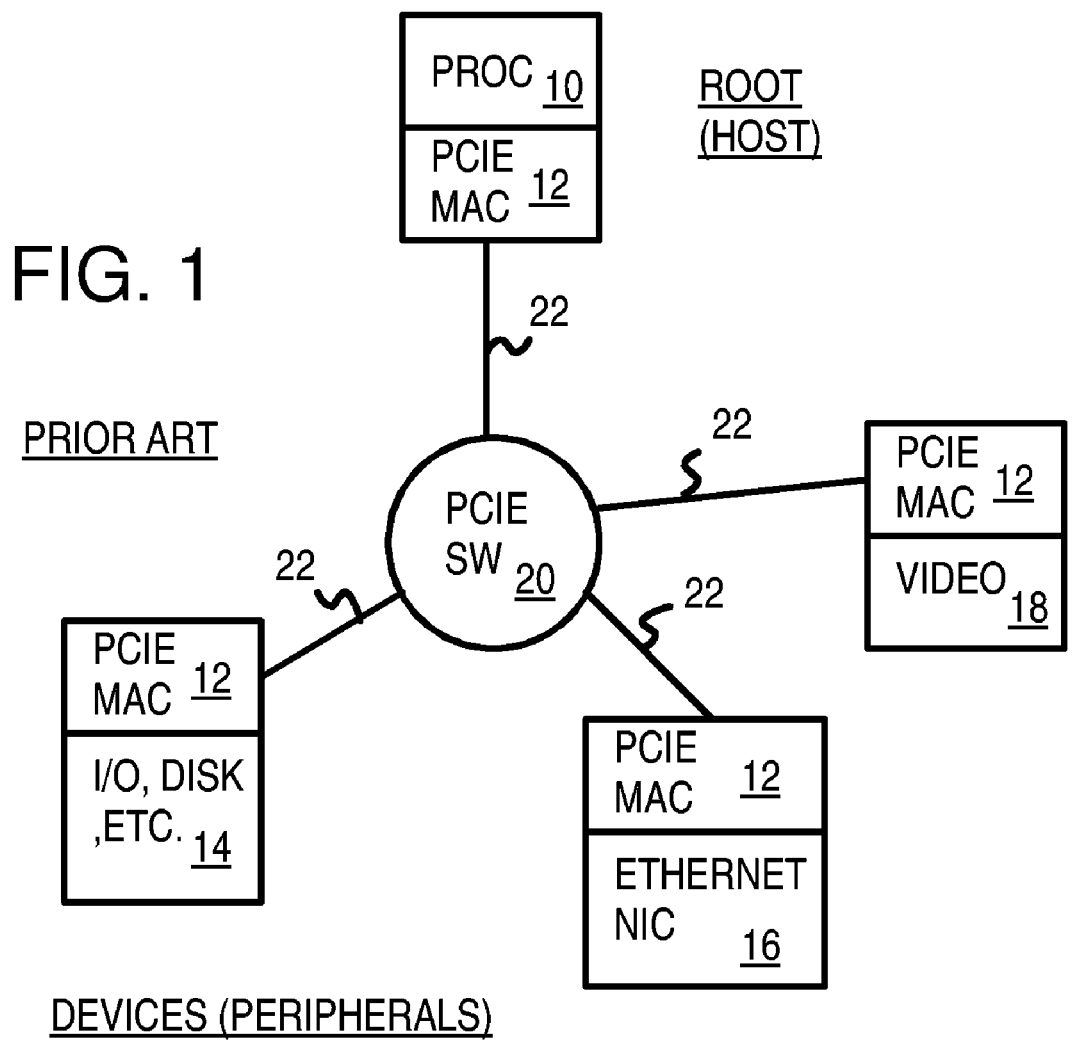
FIG. 1 shows a PC connecting to peripherals using a PCIE switch.
Figure 2:
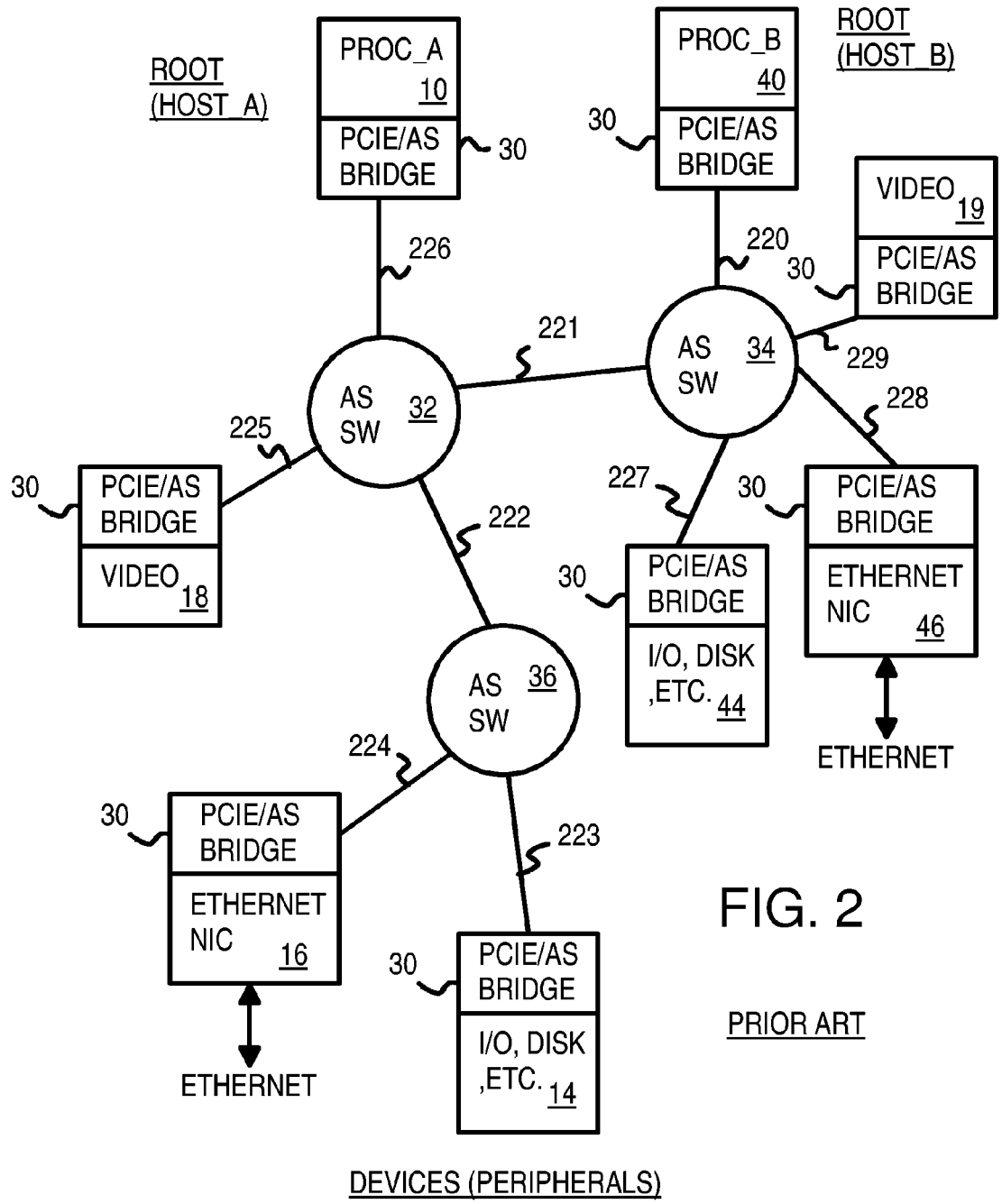
FIG. 2 shows 2 hosts sharing some peripherals over a common AS switching network.
Figure 3:
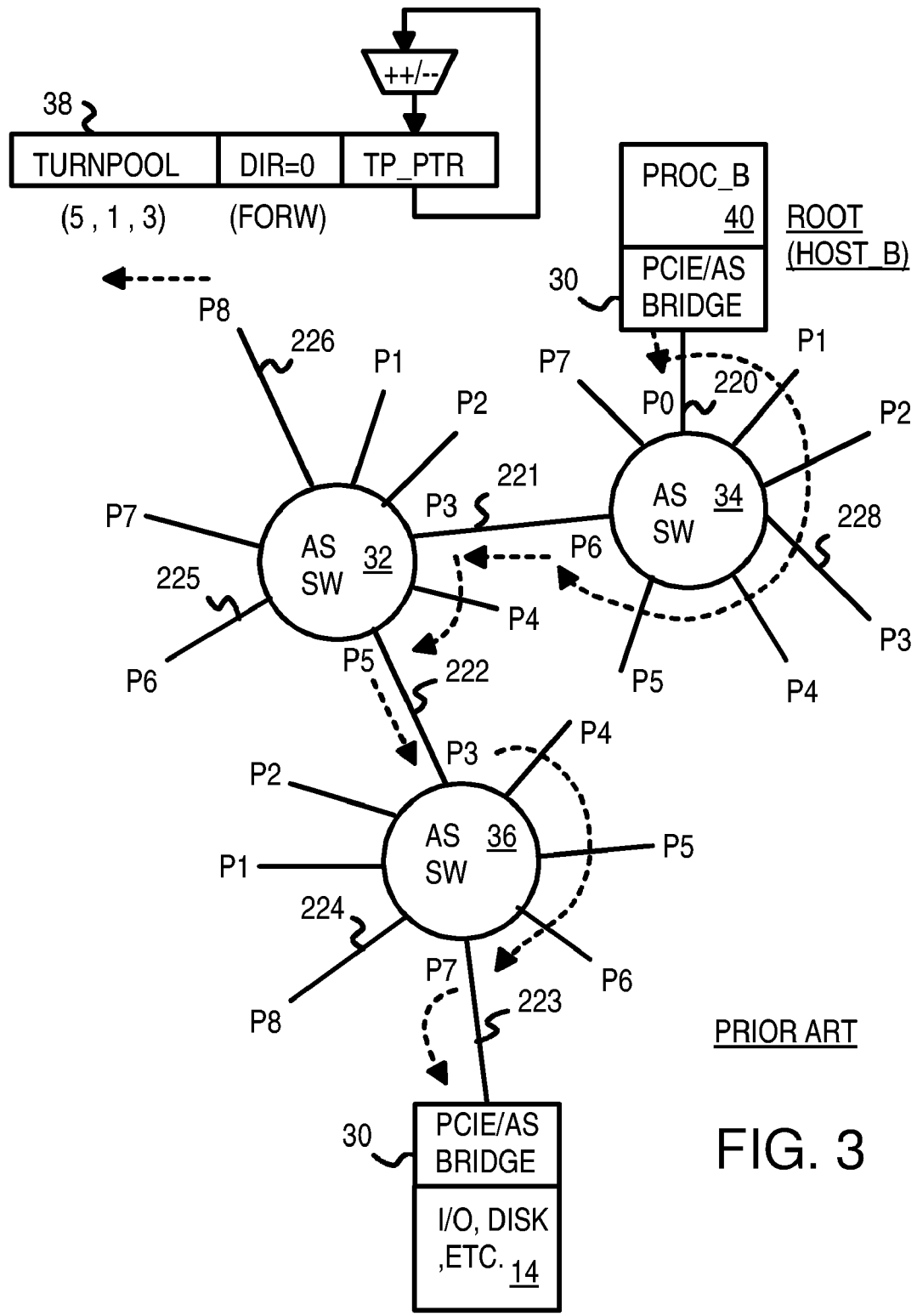
FIG. 3 highlights turnpool routing through AS switches.
Figure 4:
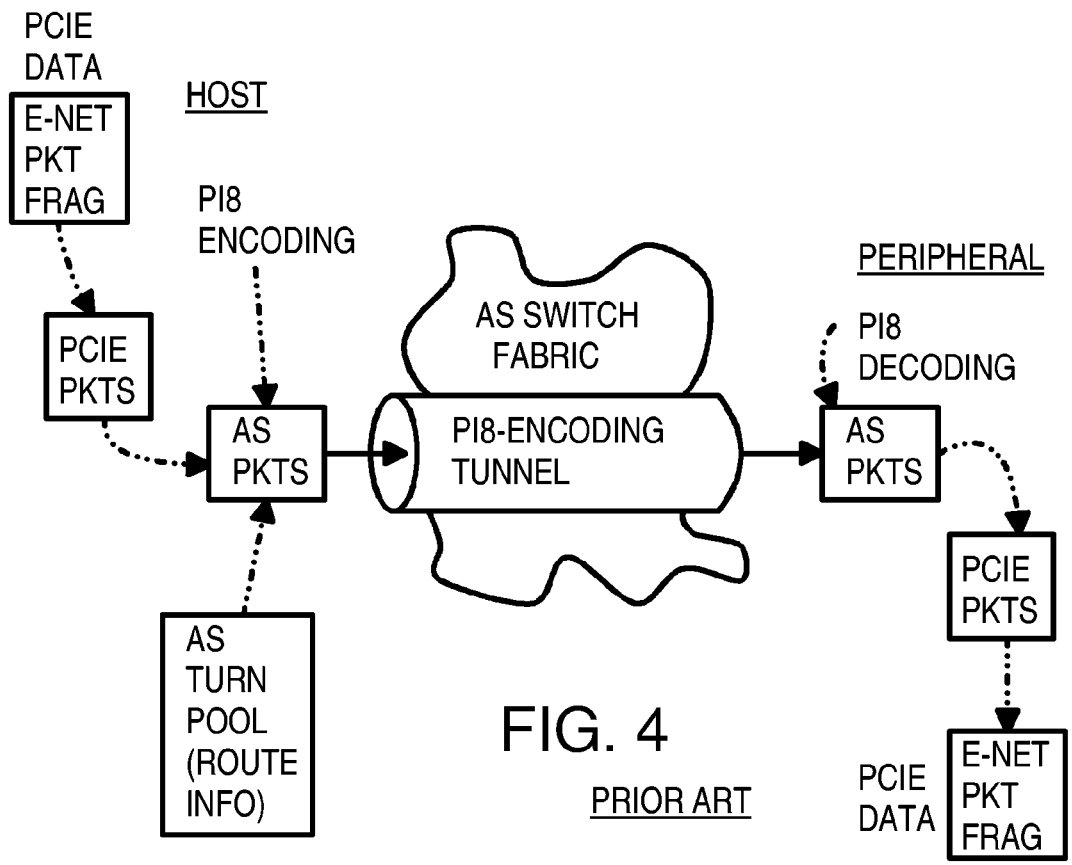
FIG. 4 highlights PCIE tunneling through an AS fabric.
Figure 5:
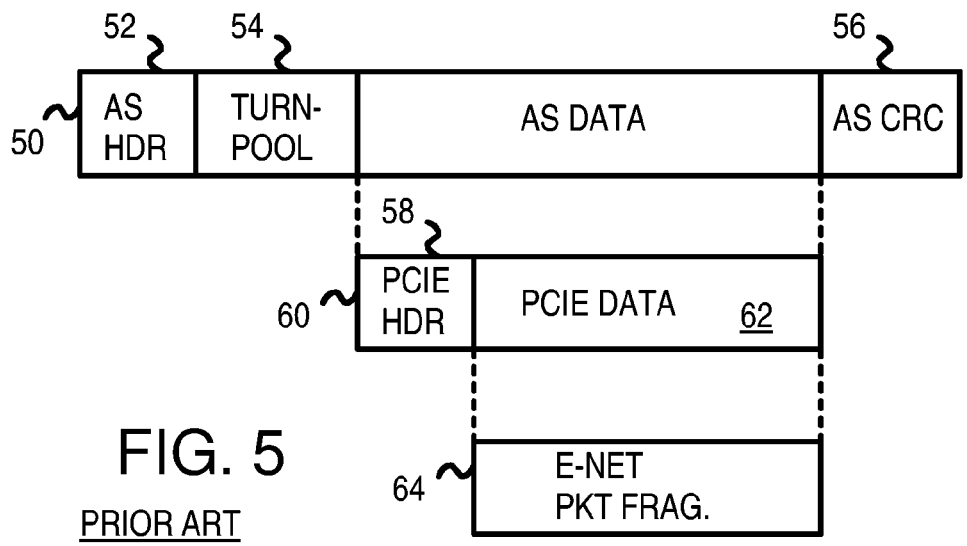
Figure 6:
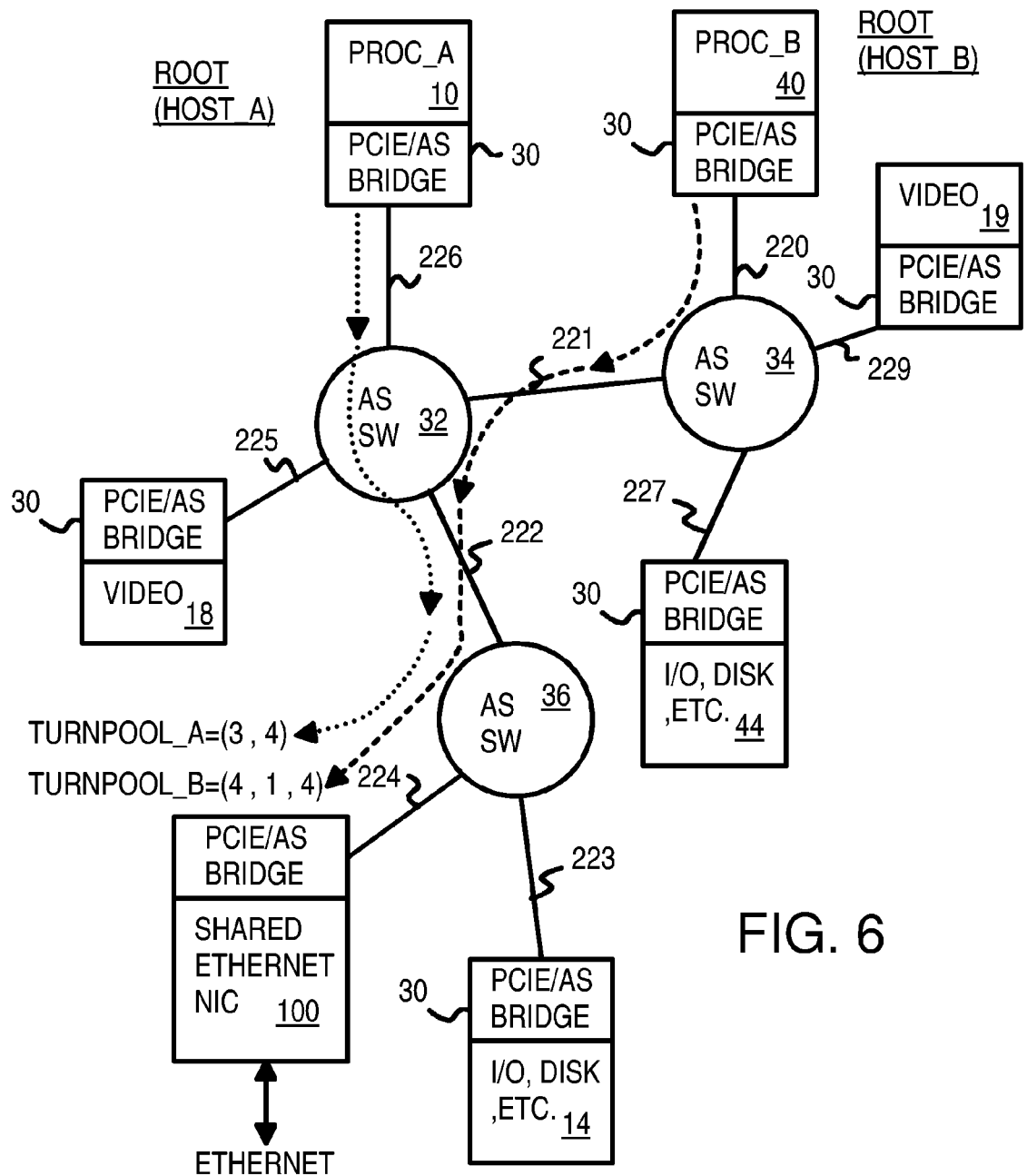
FIG. 6 shows a multi-host AS fabric with a shared NIC.

FIG. 6 shows a multi-host AS fabric with a shared NIC. AS switches 32, 34, 36 form an Advanced Switching (AS) fabric that is shared by hosts 10, 40. Peripherals video 18 and disk 14 are used primarily by host 10, while video 19 and disk 44 are used by second host 40.

Rather than have a separate Ethernet NIC for each host, shared Ethernet NIC 100 provides one gateway to an Ethernet (and perhaps to an Internet gateway through the Ethernet). Shared Ethernet NIC 100 has separate command and data registers for each host, but only one physical layer and physical connection to the Ethernet.

Host 10 may not be aware of host 40, at least at some levels or for some software programs. When writing to an Ethernet NIC, Ethernet software on host 10 may write to the same Ethernet command and data registers, at the same addresses, as host 40 does. Ethernet packet fragments containing these writes that are encapsulated as data within AS packets sent from host 10 may appear to be very similar to those sent from host 40.

Since host 10 and host 40 may not be aware of each other, their Ethernet fragments inside data payloads may write to the same registers on a shared Ethernet NIC. A shared Ethernet NIC may not be able to distinguish between Ethernet data from host 10 and from host 40, once the Ethernet data is extracted from the AS and PCIE packets.

A separate set of these Ethernet registers is kept in shared Ethernet NIC 100 for each host. However, shared Ethernet NIC 100 must be able to distinguish which of hosts 10, 40 sent the Ethernet data. This information is not available within the Ethernet data itself.

Turnpool Routing Used to Identify Different Host Processors

While the standard Ethernet fragments inside the data payload cannot distinguish between hosts 10, 40, the routes taken through the AS fabric by AS packets from each host to shared Ethernet NIC 100 differ. For example, host 10 encapsulates Ethernet fragments in AS packets that are sent over links 226, 222, 224 and through AS switches 32, 36 to shared Ethernet NIC 100, while host 40 sends encapsulated Ethernet fragments within AS packets that pass through links 220, 221, 222, 224 and AS switches 34, 32, 36, respectively. Thus the routes taken by AS packets differ for each host.

The different routes from each host to shared Ethernet NIC 100 can be described by the turnpools. For example, AS packets from host 10 to shared Ethernet NIC 100 may have a turnpool of (3,4), while AS packets from host 40 to shared Ethernet NIC 100 have a turnpool of (4,1,4).

The inventor has discovered that turnpool information may be used to distinguish between packets from the two hosts. Shared Ethernet NIC 100 examines the turnpools from each AS packet to identify which host sent the packet. A different set of Ethernet command and data registers is accessed for each different turnpool. Thus each host writes to a different set of Ethernet registers, even when the Ethernet fragments sent from each host is identical.

Shared Ethernet NIC 100 is modified from a standard Ethernet NIC since it is able to read the turnpools, and uses the turnpool to select a set of registers for access. A PCIE/AS bridge built into shared Ethernet NIC 100 extracts the turnpool information from incoming AS packets and assigned a context and set of Ethernet registers to that host. The host is identified by its AS packet's turnpools.

Figure 7:
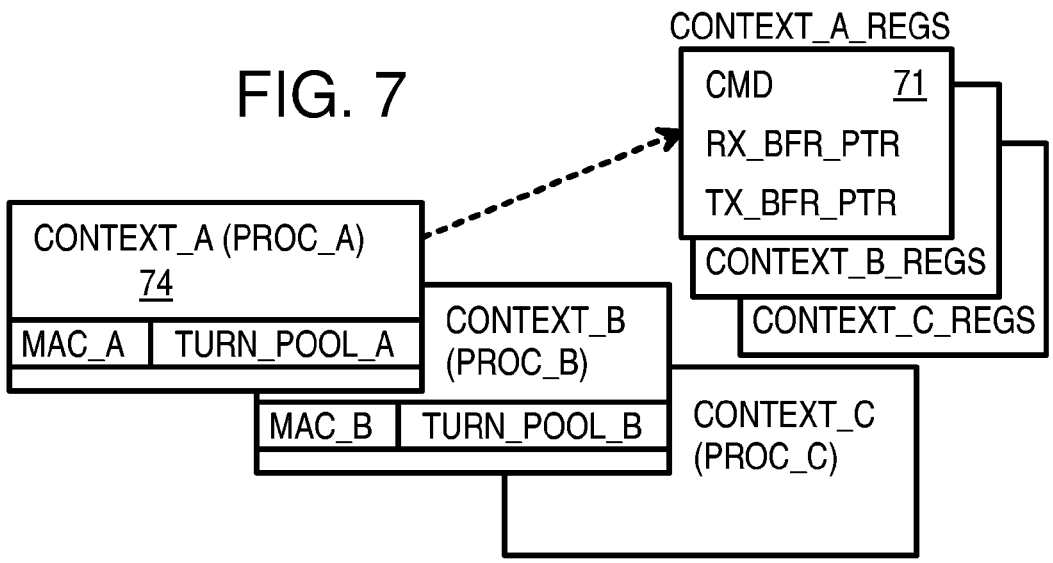
FIG. 7 shows multiple sets of Ethernet registers for multiple contexts.

Multiple Register Sets for Different Host Processors—FIG. 7

FIG. 7 shows multiple sets of Ethernet registers for multiple contexts. Each host processor typically operates in a separate context. Processor A is assigned context A and writes to a first set of Ethernet registers, CONTEXT_A_REGS in context registers 71 in shared Ethernet NIC 100. Processor B is assigned a different context B and writes to a different set of Ethernet registers, CONTEXT_B_REGS in context registers 71 in shared Ethernet NIC 100. A third processor C could be assigned a third context C and write to a third set of Ethernet registers, CONTEXT_C_REGS.

Each set of context registers 71 contains the standardized Ethernet NIC registers, such as a command register, a status register, a transmit-buffer-pointer register, and a receive-buffer-pointer register.

Context table 74 is a look-up table that contains information identifying each of these multiple contexts. For example, one entry in context table 74 is an entry for processor A, which is assigned to context A. MAC address MAC_A is the Ethernet MAC address assigned to packets for processor A.

Each context entry in context table 74 also contains the turnpool extracted from an AS packet received from that context's processor. As noted in FIG. 6, each host processor has a different turnpool to shared Ethernet NIC 100, since AS packets from each processor follow a different route through the AS fabric. Thus the turnpool is unique for each processor within an AS fabric.

Each entry in context table 74 associates a turnpool with a locally-programmed MAC address. Turnpools are extracted from AS packets from the host processors, while the locally-programmed MAC addresses match MAC addresses contained in Ethernet packets transmitted and received over the external Ethernet.

Figure 8:
FIG. 8 shows lookups in the context table for both incoming and outgoing Ethernet packets.

FIG. 8 shows lookups in the context table for both incoming and outgoing Ethernet packets. After processors have been sending and receiving Ethernet packets for some time, entries exist in context table 74 for the processors. For example, processor A has been assigned context A, identified by identifier CTX_A, with TURNPOOL_A and MAC_A stored in its entry in context table 74. Likewise, processor B has been assigned context B, identified by identifier CTX_B, with TURNPOOL_B and MAC_B stored in its entry in context table 74.

Receive (RX) Ethernet Packet

When a packet is received by shared Ethernet NIC 100 from the external Ethernet link, this incoming or received (Rx) Ethernet packet contains a destination MAC address that is assigned to shared Ethernet NIC 100, MAC-X. This MAC address is extracted from the Ethernet packet and compared to MAC addresses stored in entries in context table 74.

When one of the stored MAC addresses in context table 74 matches the received packet's MAC_X, that entry with the matching MAC address is selected. The matching entry also has a context identifier and a turnpool. The context identifier can be used to select the corresponding set of context registers 71 for the processor context of the matching entry in context table 74. This set of registers can be read for other information, such as a receive pointer to tell the NIC where to store the received Ethernet packet's data in the main memory of a specific host.

The turnpool from the matching entry is inserted into an AS packet header and the received Ethernet packet or a fragment of that Ethernet packet can be encapsulated by the AS packet. The AS packet is then sent through the AS fabric to the processor matching that was assigned that context. Since the turnpool from the matching entry specifies the route through the AS fabric, the AS packet is sent to the correct host processor. The direction bit in the AS packet can be inverted or set for the proper routing direction if necessary and the turnpool pointer set or cleared or otherwise initialized as needed for proper routing.

Transmit (TX) Ethernet Packet

When a host processor intends to transmit an Ethernet packet, it creates a descriptor of the packet, indicating the order, length, locations of each of the fragments, and writes a send command indicating the location of the descriptor to shared Ethernet NIC 100. The host processor's PCIE/AS bridge attaches the proper turnpool that routes the AS packet to shared Ethernet NIC 100.

Once shared Ethernet NIC 100 receives the AS packet from a host processor, it extracts the turnpool from the AS packet. The extracted turnpool is compared to stored turnpools in context table 74. When a matching turnpool in context table 74 is found that matches the turnpool from the AS packet, the matching entry in context table 74 is selected. The context for this entry selects one set of context registers 71 to be written to by data in the AS packet, or that have a transmit pointer used by shared Ethernet NIC 100 to find Ethernet fragments to be transmitted as Ethernet packets over the external Ethernet link.

The MAC address from the matching entry in context table 74 is inserted into the Ethernet packets being transmitted by shared Ethernet NIC 100 as the source MAC address. This source MAC address is later returned as the destination MAC address when an external Ethernet node sends back a reply Ethernet packet.

Initializing a Context

Before a processor sends its very first Ethernet packet, it must first setup the configuration registers. When the processor sets up the configuration register for the first time, it may not yet have an entry in context table 74. The turnpool extracted from the first AS packets from that host processor is compared to other turnpools stored in context table 74, but no match is found. Shared Ethernet NIC 100 determines that this host processor has not yet been assigned a context, so a new context is assigned to this processor. The extracted turnpool is stored in a new entry in context table 74, and a new context identifier assigned and stored in the new entry. A MAC address is also assigned to this context and stored in the new entry.

Shared Ethernet NIC 100 may be assigned a range of MAC addresses, rather than just one. Each context can then be assigned to a different MAC address. Incoming Ethernet packets can be associated to a context by examining their destination MAC addresses, since each context has a different MAC address. If shared Ethernet NIC 100 had only one MAC address, then all context would have to share the same MAC. The contexts could be identified in a different way, such as using a context flag or data within the Ethernet packets, such as a context identifier in the Ethernet data. Then the context flag could be stored in context table 74 rather than the MAC addresses. A virtual LAN address or identifier (VLAN) could be used to identify among contexts that share a MAC address.

Figure 9:
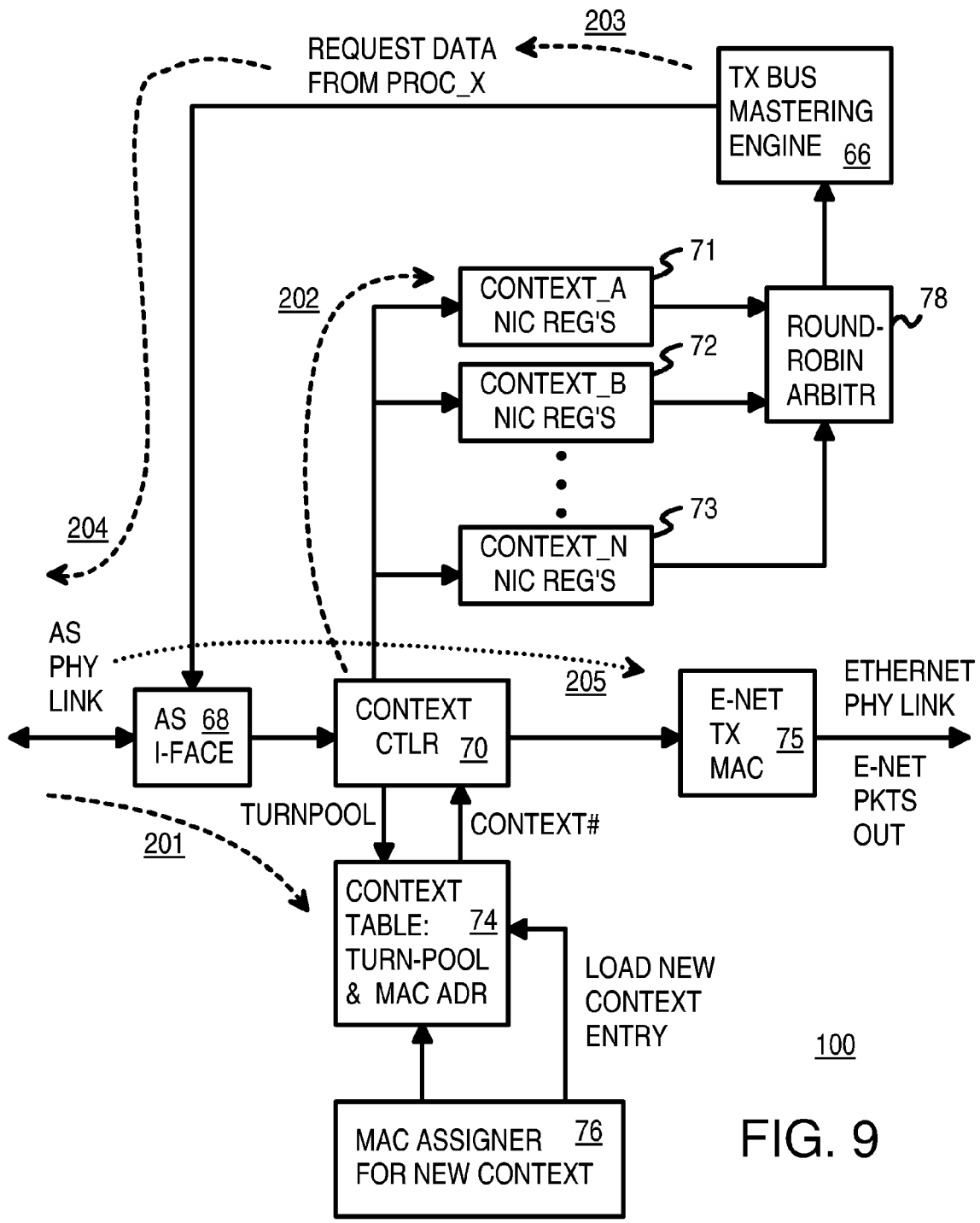
FIG. 9 shows an Ethernet-packet transmit path in the shared Ethernet NIC.

Transmit Path Logic—FIG. 9

FIG. 9 shows an Ethernet-packet transmit path in the shared Ethernet NIC. Shared Ethernet NIC 100 contains a transmit path, shown in FIG. 9, and a receive path, shown in FIG. 10. The transmit path is used to transmit Ethernet packets over a physical link such as an Ethernet cable. Commands to transmit packets are received from multiple host processors. However, rather than the host directly writing commands to shared Ethernet NIC 100, the commands are encapsulated in the data payload of PCIE packets, which are further encapsulated by AS packets. The AS switching fabric separates the processor hosts from shared Ethernet NIC 100.

AS interface 68 sends and receives AS packets over the AS fabric, using an AS or a PCIE link to an AS switch. AS packets contain a turnpool that indicates the route the AS packet took through the AS fabric from the processor host to shared Ethernet NIC 100. This turnpool is extracted from the AS packets and sent to context controller 70, step 201.

Context controller 70 looks up the turnpool in context table 74, which returns a context identifier or context number for a matching entry. The context number is used by context controller 70 to select one set of context registers 71, 72, 73, step 202. For example, when the turnpool from the AS packet matches the turnpool stored in an entry in context table 74 that has a context number 2 (for context B), context registers 72 for the second (B) context is chosen.

A variety of information may be contained in the AS packet that is written to selected context registers 72. For example, a transmit-buffer pointer may be written to context registers 72, along with a "go" or transmit-now command to a command register. The transmit-now command sends a request to arbiter 78, which performs arbitration when two or more contexts request transmission at about the same time. Various arbitration schemes such as round-robin may be used by arbiter 78 to determine the winner. Losing requests are delayed until the winning request is serviced.

The winning request is sent by arbiter 78 to transmit bus-mastering engine 66. The transmit-buffer pointer from the winning one of context registers 71, 72, 73 is used by transmit bus-mastering engine 66 to send read requests (step 204) to the winning context's host. These read requests are encapsulated inside AS packets by AS interface 68, and the turnpool for that context is attached to the AS packet.

The read-request AS packet is sent by AS interface 68 back through the AS fabric to the host processor. The host processor (or a direct-memory access (DMA) engine at the host's memory) replies to the AS packet's request by reading the data at the transmit-buffer pointer and sends the requested data back to shared Ethernet NIC 100 in a reply AS packet.

In step 205, the reply data in the reply AS packet is extracted by AS interface 68 and context controller 70 checks the turnpool to associate the data with the correct context. The data may be stored in a FIFO or other buffer memory as the Ethernet packet is being formed. The source and destination MAC addresses for that context are usually part of the pre-formatted Ethernet packet fragments generated by the host processor. Once the Ethernet packet is formed, it is transmitted over the external Ethernet link by Ethernet transmitter MAC 75.

The process of transmit bus-mastering engine 66 requesting data (step 204) and reply AS packets being received, step 205, may be repeated several times. Multiple packets may be formed and sent. The transmit-pointer from context registers 71, 72, or 73 may first be used to read a descriptor, and then the descriptor points to data fragments that are sent as data in the Ethernet packet.

AS packets from different contexts could arrive and be processed by context controller 70, which routes each command and data to one set of context registers 71, 72, 73. Also, if transmit bus-mastering engine 66 can process two or more context's requests in an overlapping manner, context controller 70 may store Ethernet packet fragments from different contexts in different portions of a buffer memory (not shown). This may allow for Ethernet packets from two or more different contexts to be built in overlapping time periods.

Figure 10:
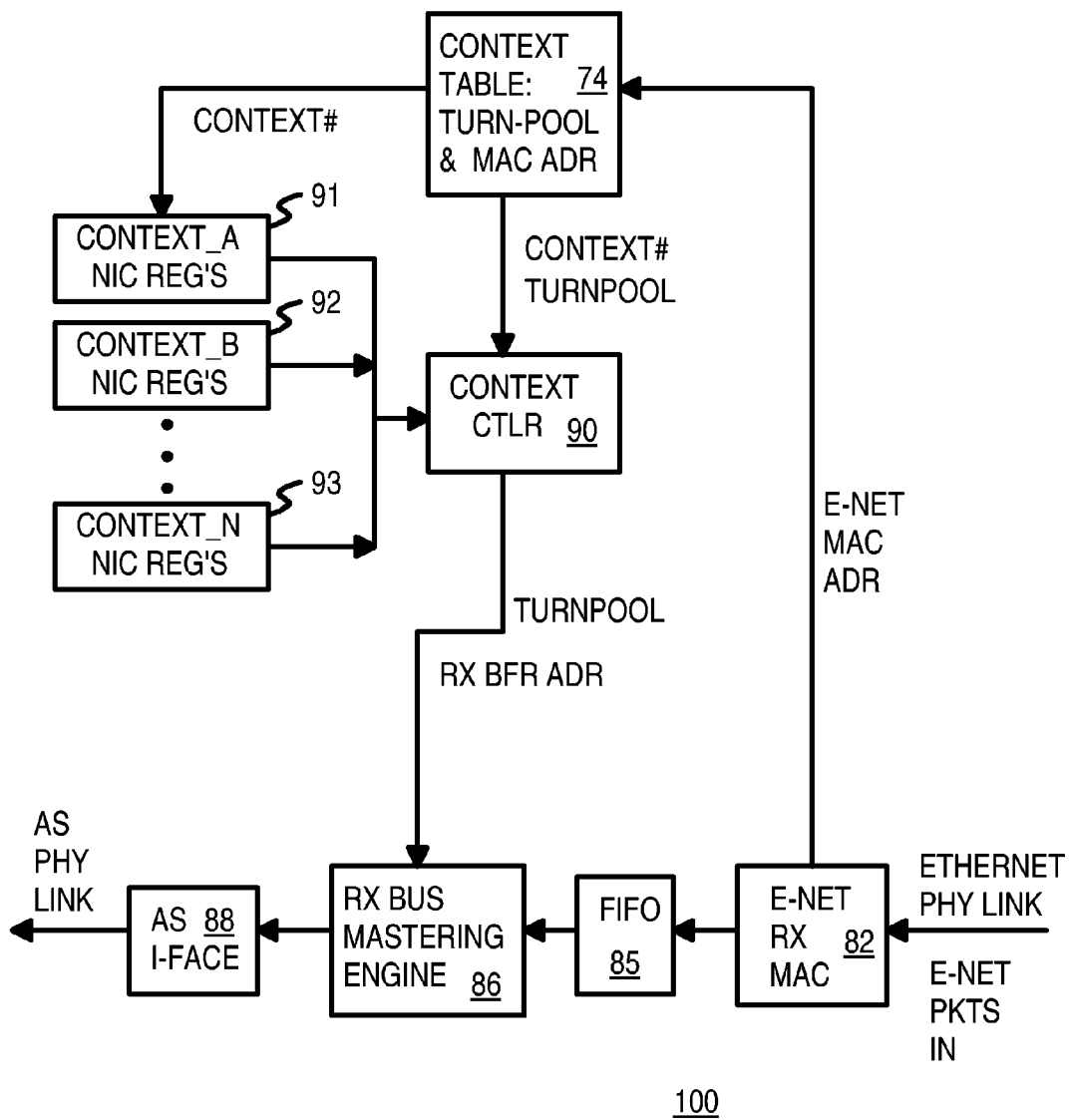
FIG. 10 shows an Ethernet-packet receive path in the shared Ethernet NIC.

Receive Path Logic—FIG. 10

FIG. 10 shows an Ethernet-packet receive path in the shared Ethernet NIC. The receive path is used to receive incoming Ethernet packets from a physical link such as an Ethernet cable. Ethernet receiver MAC 82 has physical-layer receivers that receiver serial data from the Ethernet cable and extract the data stream. Packet data received by Ethernet receiver MAC 82 is loaded into FIFO 85.

The destination MAC address from packets received by Ethernet receiver MAC 82 is sent to context table 74. The destination MAC is compared to stored MAC addresses in context table 74 for different processor contexts. When a matching MAC is found in context table 74, the context number and turnpool for that matching entry is read from context table 74. The context number selects one of context registers 91, 92, 93 for access.

Context controller 90 reads information from the context register 91, 92, 93 selected by the context number from the matching entry in context table 74. This information can include a receive-buffer pointer, RX_BFR_ADR that is sent to receive bus-mastering engine 86.

Receive bus-mastering engine 86 sends received packet data from FIFO 85 to the host processor using AS packets. The receive-buffer pointer, RX_BFR_ADR from the selected context registers 91, 92, 93 is sent with the AS packet to tell the processor or its DMA engine where in memory to write the received packet data to.

The turnpool for the receive context read from the matching entry in context table 74 is included in the AS header of the AS packet being formed to carry the receive-buffer pointer and received packet data. This turnpool allows the AS packet to be routed through the AS fabric to the processor corresponding to this context. AS interface 88 sends the AS packets over the link to the nearest AS switch, which then uses the turnpool information to continue routing the AS packet to the context's processor.

Figure 11:
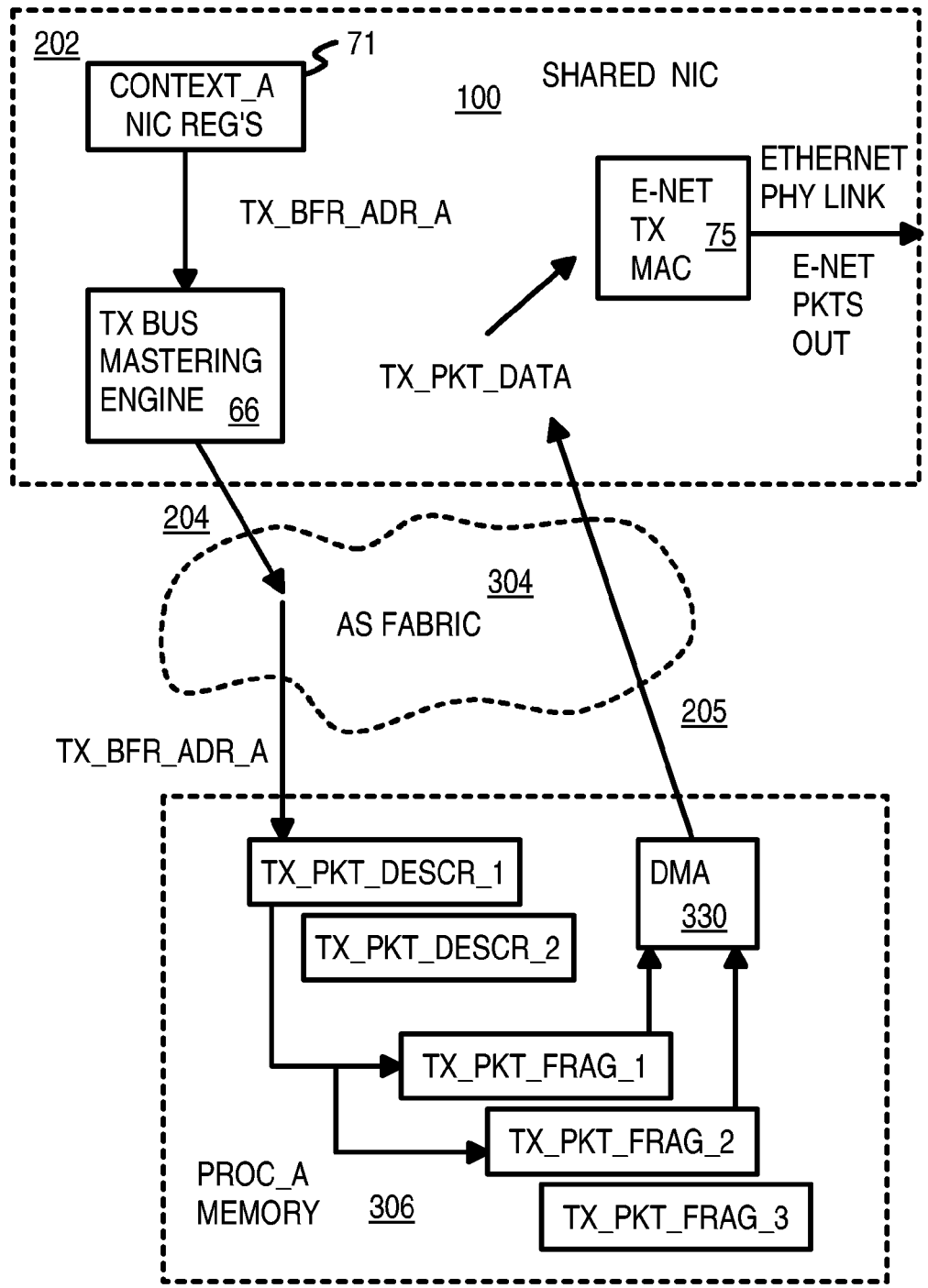
FIG. 11 highlights building and transmitting an Ethernet packet.

FIG. 11 highlights building and transmitting an Ethernet packet. A host processor writes to context registers 71 (step 202 of FIG. 9) by sending AS packets to shared Ethernet NIC 100. A transmit buffer pointer TX_BFR_ADR_A is written to context registers 71. After a transmit-now command is written to context registers 71, arbitration is performed and transmit bus-mastering engine 66 sends a request to the host processor for the data to transmit in the Ethernet packet. Transmit bus-mastering engine 66 reads the transmit buffer pointer TX_BFR_ADR_A from context registers 71 and sends a request to the host processor inside an AS packet that is sent through AS fabric 304 (step 204).

Once the AS packet is received by the host processor, the host processor, or its DMA engine 330, reads its processor memory 306 at the location indicated by transmit buffer pointer TX_BFR_ADR_A. This is the location of a transmit descriptor, TX_PKG_DESCR_1. The transmit descriptor has information describing the Ethernet packet to be transmitted, and may include a destination address, data length, sequence number, etc.

The transmit descriptor can be sent back to shared Ethernet NIC 100 through AS fabric 304 inside a reply AS packet. The descriptor information can be stored in a buffer on shared Ethernet NIC 100. The transmit descriptor also contains pointers to packet fragments in processor memory 306. Transmit bus-mastering engine 66 can then form additional AS packets with these pointers, requesting that data in these packet fragments be sent over AS fabric 304 to shared Ethernet NIC 100 from processor memory 306 (step 205).

The packet fragment data, TX_PKT_DATA, read from processor memory 306 by DMA 330 is sent through AS fabric 304 to shared Ethernet NIC 100. Shared Ethernet NIC 100 then assembles the data into one or more Ethernet packets for the context of the processor into a buffer on the shared NIC. Ethernet transmitter MAC 75 then transmits these Ethernet packets over the Ethernet physical link.

A processor traditionally writes to registers on a NIC or Ethernet controller that is installed in an expansion bus on the local PC, such as an AT or PCI bus. The Ethernet NIC has a set of several registers, including a command register, a status register, and pointer registers that contain address pointers to buffers in the processor's memory (such as main-memory DRAM on a PC). The buffers in main memory include a receive buffer that receives Ethernet data from incoming Ethernet packets, and transmit buffers that contain packet descriptors and fragments of outgoing Ethernet packets that have not yet been collected by the Ethernet NIC for transmission.

Rather than have these Ethernet register close to the host processor, on a local expansion bus, these registers are more remote from the host processor. These Ethernet registers reside on shared Ethernet NIC 100, which is separated from the host processor by one or more AS switches in the AS fabric. The host processor writes to these registers by sending AS packets, with the address location of the context of the shared Ethernet NIC, through the AS fabric to shared Ethernet NIC 100 (FIG. 6).

However, the buffers containing the Ethernet packet descriptors and fragments may still reside on the main memory of the local host processor.

ALTERNATE EMBODIMENTS

Several other embodiments are contemplated by the inventor. For example, a first address may be used to transfer packets over a switching fabric, while a second address is used to identify the physical location of a device in the processor's memory and IO address map. Another embodiment may be use IP addresses instead of AS addresses. The source address of the processor sending the packet may be stored rather than the turn pool. Other types of addressing scheme may be used. Other information could be stored in context table 74 such as maintenance, time-out, error, etc. Context table 74 could be very simple or could have multiple levels or be combined with other tables or be part of a larger table. Context table 74 could be implemented as a linked list rather than a flat table and could be stored in a memory in a variety of ways or backed up to another memory. The context "table" could be implemented in logic gates rather than a memory array, especially for smaller tables.

Processor memory 306 could be shared by more than one host processor. Then the context number could be used to form the pointers, or to add an offset to pointers, with the offset varying with the context. For example, processor memory 306 could be a disk drive rather than a main memory.

Pointers may be full addresses or may be parts of addresses, or may somehow indicate an address. Pointers may be multiplied by a scale factor or may be relative to an offset, for example.

Context identifiers such as CTX_A, CTX_B can be stored in each entry for each context in context table 74, or the context identifiers may be implied by the location of the entry within the table. The turnpool or MAC could also be used to identify the context entry. Using a simple context number as the context identifier may simplify control logic in shared Ethernet NIC 100.

While Ethernet has been described in the examples, other external network interfaces could be substituted. For example, shared Ethernet NIC 100 could be modified to be a token-ring NIC, or a wide-area-network (WAN) NIC to a gateway to the Internet. Other kinds of NIC's could be substituted, such as an Infiniband NIC, a Fiber Channel NIC, a Serial Interface NIC, an HDLC Controller NIC, a SONET interface NIC, a RapidIO Interface NIC, a wireless network NIC, a 802.11A, B or G NIC, a Wimax Interface NIC, or a wireless Radio NIC, a optical interface NIC, a copper cable interface NIC, a electrical signal interface NIC, or a wireless signal interface NIC.

Shared Ethernet NIC 100 could even support multiple network protocols. For example, the source IP address could be stored in context table 74 along with the lower-level MAC address for Ethernets that connect to TCP/IP networks. Other information that may be stored include a VLAN's VID, an Ethernet Packet Type for Application Switching, a TOS field for Priority Services, and 802.11 P information for Ethernet Priority, etc.

AS packets from different contexts could arrive and be processed by context controller 70, which routes each command and data to one of context registers 71, 72, 73. Also, if transmit bus-mastering engine 66 can process two or more contexts' requests in an overlapping manner, context controller 70 may store Ethernet packet fragments from different contexts in different portions of a buffer memory (not shown). This may allow for Ethernet packets from two or more different contexts to be built in overlapping time periods. Some pipelining of packet transmission or reception may also be allowed.

The functions described herein may be implemented in a variety of ways, and be divided into blocks with different partitionings. Firmware or programmable blocks may be used for some functions. Context registers may be separate registers, part of a register file, or part of a larger memory and can be managed in a variety of ways.

The invention is especially useful for high-density systems with many processors, such as blade servers. Many host processors in a chassis may share the same shared Ethernet NIC, rather than the 2 hosts shown in the examples.

The invention may be extended to other kinds of peripherals, such as video controllers, printer controllers and printers with internal controllers, Hard Disk Drive controller, Floppy Disk Drive Controller, Optical Disk Drive Controllers, ATAPI Controllers, Serial ATA Controllers, Serial SCSI (SAS) Controllers, RAID controllers, SCSI Controllers, Fiber Channel SAN Controllers, iSCSI Controllers, and different drives with internal controllers built in, including optical drives, magnetic drivers, semiconductor drives such as flash media drives, magnetic bubble drives, etc., including those in the form of CDROM, CDROM RW, DVD ROM, DVD ROM RW and various variations.

Standard peripheral-driver software could run on each host and not be aware of any other hosts that share the peripheral. The peripheral extracts the turnpool from the AS packet and uses the turnpool to identify which host sent the packet. Separate registers in the peripheral could then be addressed by concatenating the turnpool or a context number selected by the turnpool with the register addresses. Alternately, the peripheral could delay or send an error message back to a second host when a first host is currently using the peripheral.

Each set of context registers 71 contains the standardized Ethernet NIC registers, such as a command register, a status register, a transmit-buffer-pointer register, and a receive-buffer-pointer register. Other registers may also be included, such as a register that holds the MAC address. Information Registers could also be added. Different manufacturer may call their registers with different names. The command register is the main interface, usually used to set up the NIC. The parameters may include when to generate the interrupt, a number of consecutive retries after collision in half duplex mode, and the speed that the NIC should operate in, 10/100/1000/10000 Mbps, etc. Other registers may provide for a loop-back test-mode from the buffer, from the transmitter, from the Physical layer, etc. Another register may indicate which multi-cast address(es) to receive and which one(s) to filter out. Other functions may include Wake on LAN, Half Duplex or Full Duplex, or automatic discovery, some may have polarity reversed, some may have AUI/BNC select for the interface type. Information registers may be read only, or sometime read and reset, or read and even writable.

The Transmit Buffer may contain the beginning and ending address of the buffer in memory. A Head pointer could indicates the beginning of valid data is, and a Tail pointer could indicates where valid data ends. There may be hundreds of registers with hundreds of bytes.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A shared network interface controller (NIC) comprising:
   an external-network connection that sends external packets and receives external packets over an external network using an external-network protocol;
   a local network connection for sending and receiving local packets to and from a first processor and to and from a second processor on a local network using a local-network protocol;
   wherein the local packets include a routing specifier that specifies a route through the local network;
   a protocol converter for embedding data from external packets received from the external network inside local packets sent over the local network;
   a first set of registers that include a first command register to command transmission of an external packet that contains data from the first processor and a first transmit-pointer register for locating data to transmit in the external packet and a first receive-pointer register for indicating a location to store data from external packets received;
   wherein local packets from the first processor received by the local network connection of the shared NIC have a first routing value of the routing specifier that specifies a first route between the first processor and the shared NIC;
   a second set of registers that include a second command register to command transmission of an external packet that contains data from the second processor and a second transmit-pointer register for locating data to transmit in the external packet and a second receive-pointer register for indicating a location to store data from external packets received;
   wherein local packets from the second processor received by the local network connection of the shared NIC have a second routing value of the routing specifier that specifies a second route between the second processor and the shared NIC;
   wherein the first routing value and the second routing value are different values; and
   a context controller that selects the first set of registers for access in response to the local packets when the local packets contain the first routing value; the context controller selecting the second set of registers for access in response to the local packets when the local packets contain the second routing value,
   whereby the external network connection is shared by the first and second processors and the first and second set of registers are selected for access by the first or second routing values for the local network.

2. The shared network interface controller (NIC) of claim 1 wherein the external packets received by the external-network connection have as a destination address a first external-network address or a second external-network address;
   further comprising:
   a first context association that associates access of the first set of registers with the first routing value and with the first external-network address;
   a second context association that associates access of the second set of registers with the second routing value and with the second external-network address;
   wherein the first set of registers is accessed by local packets from the first processor and when receiving external packets having the first external-network address as the destination address;
   wherein the second set of registers is accessed by local packets from the second processor and when receiving external packets having the second external-network address as the destination address.

3. The shared network interface controller (NIC) of claim 2 further comprising:

a context table having association entries that associate routing values with external-network addresses and register sets;

a first entry in the context table containing the first context association of the first routing value with the first external-network address and access of the first set of registers; and a second entry in the context table containing the second context association of the second routing value with the second external-network address and access of the second set of registers.

4. The shared network interface controller (NIC) of claim 2 wherein the external network is an Ethernet and the first and second external-network addresses are media-access controller (MAC) addresses.

5. The shared network interface controller (NIC) of claim 2 wherein local packets do not contain an endpoint address uniquely indicating the first processor, the second processor, or the shared NIC;

wherein local packets contain only routing values to determine routes through the local network.

6. The shared network interface controller (NIC) of claim 5 wherein the local network is an Advanced Switching (AS) network;

wherein the first routing value is a first turnpool indicating the first route between the first processor and the shared NIC wherein the second routing value is a second turnpool indicating the second route between the second processor and the shared NIC.

7. The shared network interface controller (NIC) of claim 6 wherein the first and second turnpool each comprise a series of switch values, each switch value indicating a number of ports to skip over between an ingress port and an egress port of a switch in the local network.

8. The shared network interface controller (NIC) of claim 2 wherein the first processor writes to a first local address to write to the first set of registers;

wherein the second processor writes to a second local address to write to the second set of registers;

wherein the first local address and the second local address have a same numerical value;

whereby processors transparently write to the first and second set of registers on the shared NIC using a same local address.

9. The shared network interface controller (NIC) of claim 2 wherein the local packets are AS packets that encapsulate Peripheral Component Interconnect express (PCIE) packets that have fragments of external packets sent over the external network as PCIE data payloads.

10. The shared network interface controller (NIC) of claim 2 further comprising:

a transmit bus-mastering engine, receiving the first transmit-pointer register and generating local packets with the first routing value to fetch first data from a first memory for the first processor, the transmit bus-mastering engine sending the first data to the external-network connection for transmission in external packets with the first external-network address;

the transmit bus-mastering engine also receiving the second transmit-pointer register and generating local packets with the second routing value to fetch second data from a second memory for the second processor, the transmit bus-mastering engine sending the second data to the external-network connection for transmission in external packets with the second external-network address.

11. The shared network interface controller (NIC) of claim 10 further comprising:

an arbiter, coupled to the context controller, for arbitrating use of the transmit bus-mastering engine between the first and second processors when the first processor writes a transmit command to the first command register at about a same time as the second processor writes a transmit command to the second command register.

12. A method for sharing a network connection comprising:

transmitting external packets by:

receiving from an inter-processor network a processor packet from a processor, the processor packet having a source-routing field that indicates a route through the inter-processor network;

selecting as a selected register set a first register set when the source-routing field identifies a first route from a first processor, or a second register set when the source-routing field identifies a second route from a second processor;

writing to the selected register set in response to a data payload in the processor packet;

when a transmit command is written to the selected register set, reading a transmit pointer from the selected register set, and fetching transmit data located by using the transmit pointer to form transmit packets;

finding an external network address associated with the selected register set and including the external network address in the transmit packets as a source address;

transmitting the transmit packets over an external network connection that is external to the inter-processor network;

receiving external packets by:

receiving from the external network connection receive packets that contain a received external network address;

searching for a matching register set that is associated with the received external network addresses;

reading a receive pointer from the matching register set; and writing received data from the receive packets to a location indicated by the receive pointer by encapsulating the received data and the receive pointer inside processor packets that have a source-routing field associated with the matching register set;

wherein each register set is associated with a different source-routing field and a different received external network address, whereby source routing fields and external network addresses are associated with registers sets for different processors on the inter-processor network.

13. The method of claim 12 wherein fetching transmit data located by using the transmit pointer comprises:

when the selected register set is the first register set, sending processor packets that contain the transmit pointer to the first processor, the processor packets containing a source-routing field that specifies the first route;

when the selected register set is the second register set, sending processor packets that contain the transmit pointer to the second processor, the processor packets containing a source-routing field that specifies the second route.

14. The method of claim 13 further comprising:

when an initial processor packet is received from a new processor on the inter-processor network, extracting a new source-routing field:

detecting a new processor by finding no register set associated with the new source-routing field;

associating an unused register set with the new source-routing field;

assigning a new external network address for associating with the unused register set; and writing to the unused register set in response to a data payload in the initial processor packet.

15. The method of claim 12 wherein the source-routing field contains a turnpool with switch values that each indicate a number of switch ports to skip over between an ingress port and an egress port on a switch along a route taken through the inter-processor network.

16. The method of claim 12 wherein the inter-processor network is an Advanced Switching (AS) network and the external network connection is a connection to an Ethernet, a token-ring network, or an Internet.

17. A shared peripheral comprising:

local network means for sending and receiving local packets over a local network to and from a first processor and to and from a second processor;

routing extraction means for reading a routing value from local packets received by the local network means over the local network;

search means, coupled to the routing extraction means, for searching for a matching association having a stored routing value that matches the routing value received;

a plurality of register sets, each register set for access by a different processor on the local network;

context controller means, coupled to the search means, for selecting a selected registers set in the plurality of register sets in response to the matching association;

arbitration means for arbitrating operation control of a peripheral device in response to peripheral commands written to the plurality of registers sets; and reply means, responsive to operation of the peripheral device by a selected association, for generating reply local packets to a selected processor on the local network, the reply local packets having a selected routing value associated with the selected association, the selected routing value specifying a route through the local network to the selected processor, whereby use of the peripheral device is shared by processors identified by routing values for routes to the processors through the local network.

18. The shared peripheral of claim 17 wherein the routing value contains a turnpool with switch values that each indicate a number of switch ports to skip over between an ingress port and an egress port on a switch along a route taken through the local network between the shared peripheral and a processor.

19. The shared peripheral of claim 18 wherein the local network is an Advanced Switching (AS) network.

20. The shared peripheral of claim 19 wherein the peripheral device is a network interface controller (NIC) allowing processors on the local network to share an external network connection; or a display adapter allowing two or more processors to update a display by writing to separate register sets; or a storage unit for storing shared data from two or more processors that write to separate register sets to access the shared data.

* * * * *